INVENTOR:
ALLAN N. GREENWOOD,
BY William Freedman
ATTORNEY

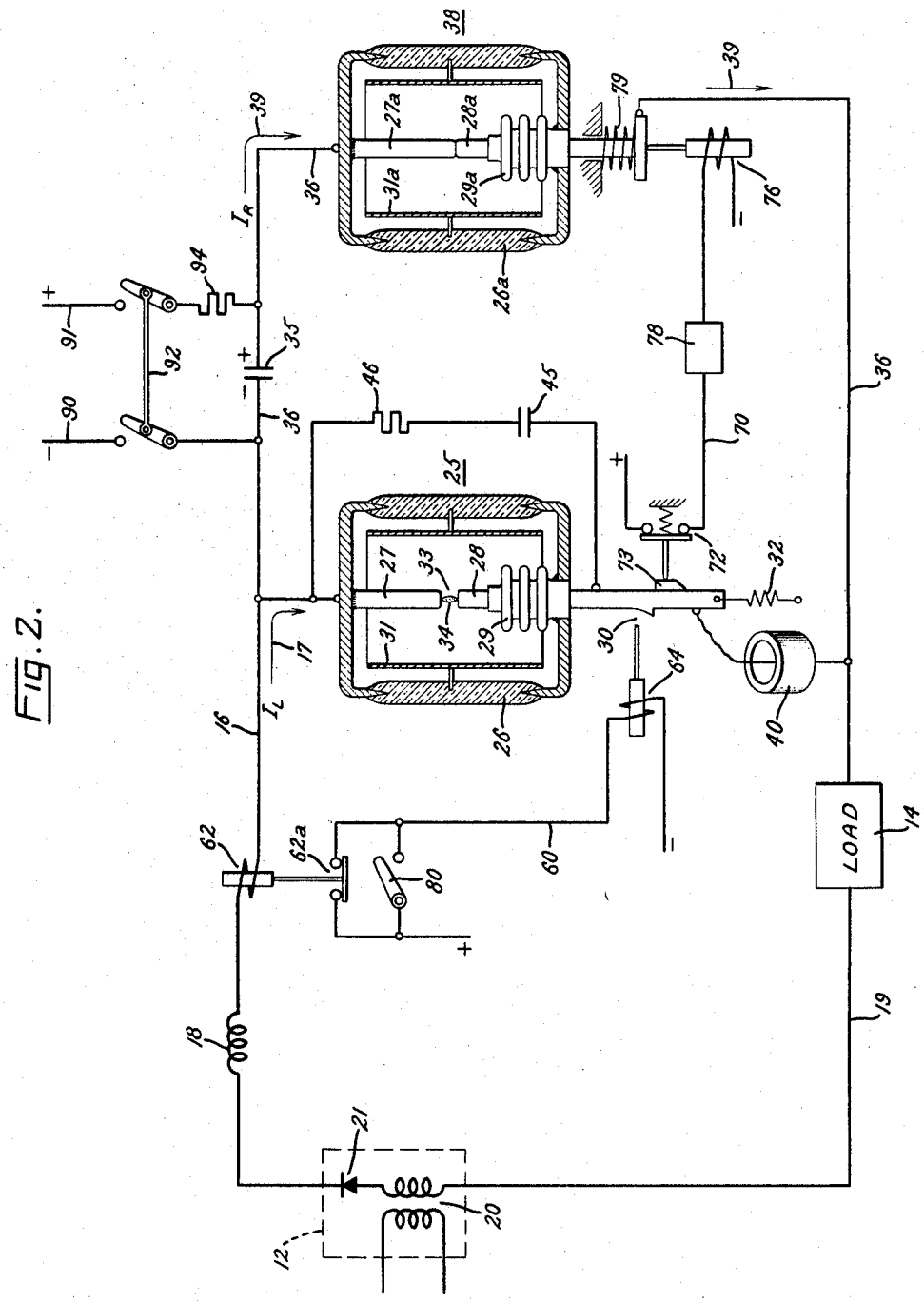

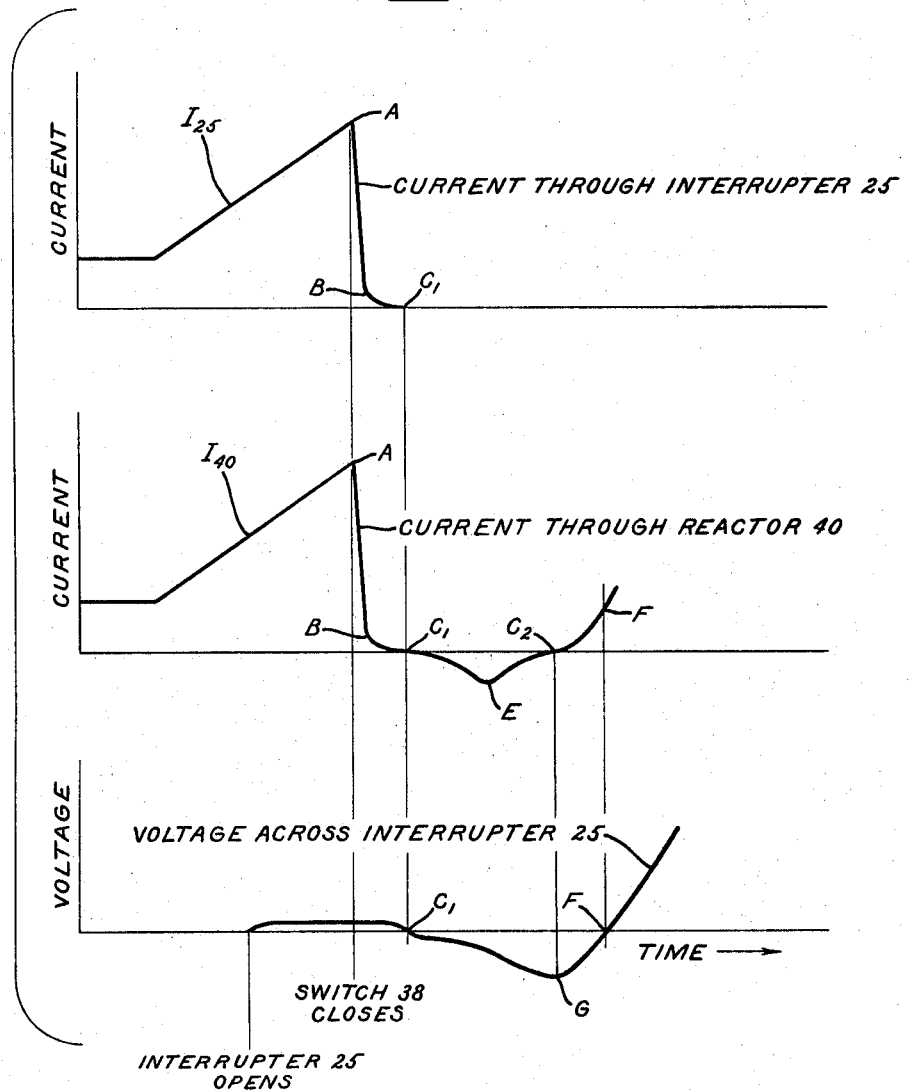

United States Patent Office 3,390,305
Patented June 25, 1968

3,390,305
CIRCUIT INTERRUPTING MEANS FOR A
HIGH VOLTAGE D-C CIRCUIT
Allan N. Greenwood, Media, Pa., assignor to General
Electric Company, a corporation of New York
Filed Dec. 14, 1965, Ser. No. 513,756
3 Claims. (Cl. 317—11)

ABSTRACT OF THE DISCLOSURE

A high voltage D-C circuit breaker in which a current zero is created by discharging a commutating capacitor through a circuit interrupting device. A saturable reactor in series with the interrupting device reduces the rate of current decay immediately prior to current zero. The rate of voltage build-up across the interrupting device immediately following current zero is controlled by means comprising a capacitor connected in parallel with the interrupting device but in series with the saturable recator.

---

This invention relates to means for interrupting a high voltage direct-current circuit and relates, more particularly, to circuit interupting means of the type in which a current zero is created by discharging a commutating capacitor through a circuit interrupting device.

In the particular circuit interrupting means that I am concerned with, a circuit interrupting device, hereinafter referred to as an interrupter, is connected in series with a high voltage direct-current line that supplies current through the interrupter. When the circuit is to be interrupted, the normally-closed contacts of the interrupter are separated to establish an arc across the gap developed between the contacts. Connected across this gap is a normally-open quenching circuit that includes a pre-charged commutating capacitor. When the above-described arc is established across the interrupter gap, the capacitor is discharged through the quenching circuit and the interrupter, thereby forcing the arcing current to zero. By the time the current zero point is reached, the gap between the contacts has attained a substantial length. If this gap is able to withstand the recovery voltage the builds up thereacross immediately after the current zero point is reached, then circuit interruption is successfully completed.

Two factors that have an important effect on whether the interrupter will be able to successfully complete the interruption are: (1) the rate at which the current decays immediately preceding current zero and (2) the rate at which the recovery voltage builds up when the current zero point is reached. Generally speaking, the likelihood of a successful interruption increases, the lower each of these rates of change becomes. In my circuit interruption means, I reduce the rate of current decay immediately prior to current zero by providing a saturable reactor in series with the interrupter. Normal load current maintains this reactor in a saturated condition, but when the current is forced toward zero, as above described, the reactor becomes unsaturated just before current zero. This desaturation introduces a relatively high inductance into the circuit that greatly reduces the rate of current decay just prior to current zero.

A problem that arises from the use of such a saturable reactor is that its presence tends to increase the rate at which the recovery voltage builds up immediately after the current zero point is reached.

An object of my invention is to provide circuit interrupting means in which the presence of the saturable reactor does not result in an increased rate of recovery voltage build-up at current zero.

Another object is to provide circuit interrupting means which utilizes the reactor to assist in reducing the rate of recovery voltage build-up at current zero.

In carrying out my invention in one form, I connect the series combination of a resistor and voltage-controlling capacitor in parallel with the interrupter and in series with the reactor. When the current through the interrupter reaches zero, the commutating capacitor attempts to charge the voltage controlling capacitor through the reactor. But since the reactor is then in an unsaturated state, it has a relatively high inductance that impedes this charging action; thereby reducing the peak inverse voltage to which the voltage-controlling capacitor is charged by the commutating capacitor and also reducing the rate-of-rise of such voltage.

For a better understanding of the invention, reference may be had to the following description taken in conjunction with the accompanying drawings, wherein:

FIG. 2 is a schematic showing of the circuit interrupting arrangement of FIG. 1 shown during an interrupting operation.

FIG. 3 is a graphical representation of certain current and voltage relationships present in the circuit of FIGS. 1 and 2.

Figure 1:
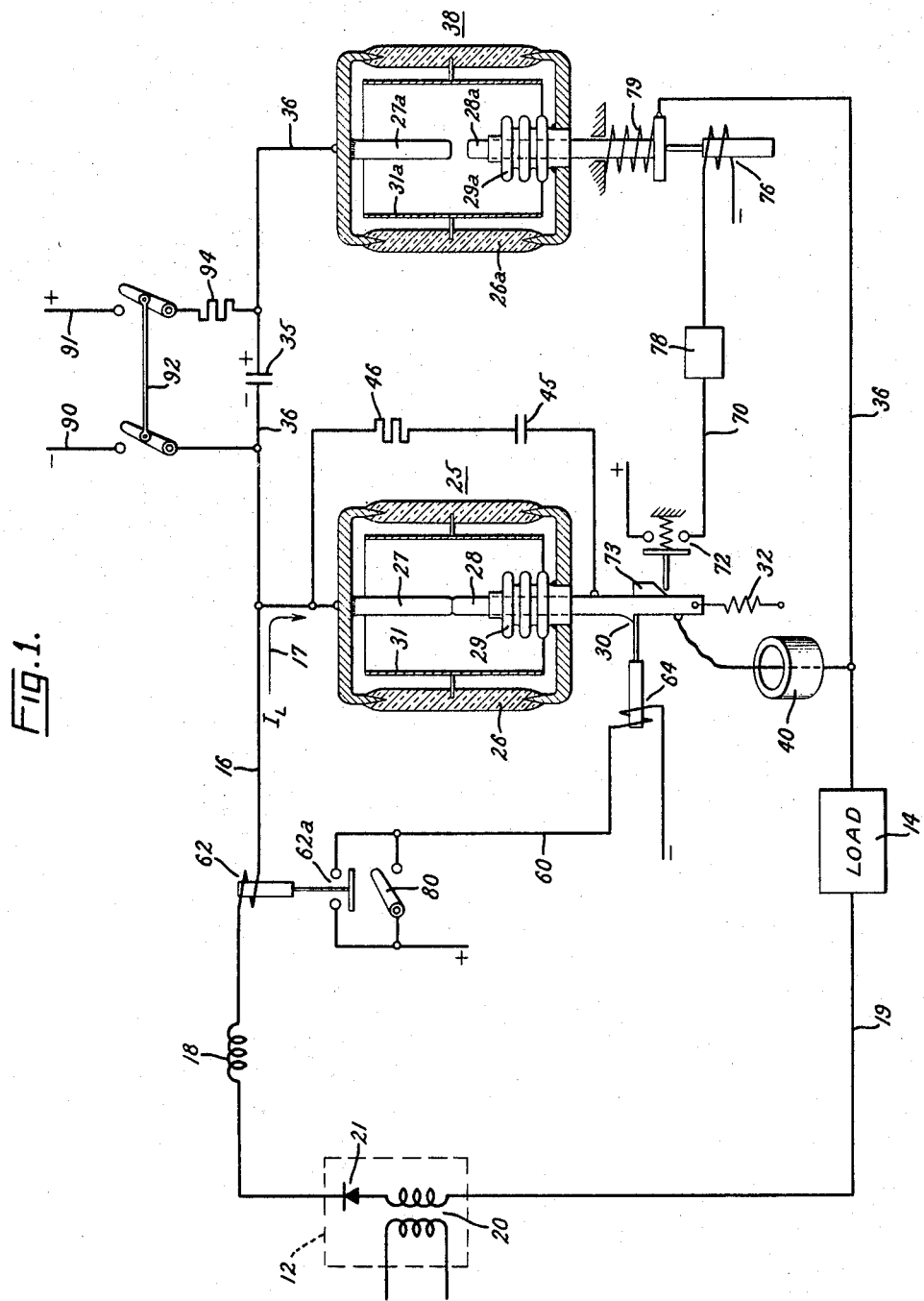
FIG. 1 is a schematic showing of a circuit interrupting arrangement embodying one form of my invention. The circuit interrupting arrangement is shown in its normally-closed position.

Referring now to FIG. 1, there is schematically shown a high voltage D-C circuit comprising a source 12, a load 14, and a power line 16 for delivering power to the load from the source. It will be assumed that the normal load current flows in the direction indicated by the arrow 17, returning to the source through a return conductor 19. The source 12 is schematically depicted as comprising a transformer 20 and a rectifier 21 connected in series with the secondary winding of the transformer. Connected in the power line 16 and in series with the source 12 and the load 14 is the usual smoothing reactor 18 which acts to smooth the current output from the source.

For controlling the flow of current to the load 14, a circuit interrupter 25 is connected in the power line 16 in series with the load 14 and the smoothing reactor 18. In a preferred embodiment of my invention, the circuit interrupter 25 is a vacuum-type circuit interrupter. As such, it comprises a highly evacuated envelope 26 partially of insulating material, and a pair of relatively movable contacts 27 and 28 disposed within the evacuated envelope 26. The upper contact 27 is a stationary contact, and the lower contact 28 is a movable contact that projects through the lower end of the envelope 26. A suitable bellows 29 sealed at its respective opposite ends to the lower contact 28 and the envelope 26 permits the lower contact to move vertically without impairing the vacuum inside the evacuated envelope 26. The lower contact 28 is releasably held in its closed position of FIG. 1 by a suitable latch 30 and is biased in a downward or opening direction by a suitable opening spring 32. When the latch 30 is released, the spring 32 drives the movable contact 28 downwardly to produce a gap 33 between the contacts, as shown in FIG. 2. This contact-separation establishes an arc 34 across the gap that is quickly extinguished and prevented from reigniting, thus interrupting the circuit, all in a manner soon to be explained in greater detail. For condensing the metallic vapors generated by the arc and for protecting the insulation of the envelope 26 from these vapors, a suitable metallic shield 31 of tubular configuration is provided inside the envelope.

The vacuum circuit interrupter 25 can be of a suitable conventional type and is therefore shown in schematic form only. Examples of vacuum type circuit interrupters suitable for this application are shown in more detail and are claimed in U.S. Patents 2,949,520, Schneider and 3,089,936, Smith, both assigned to the assignee of the present invention.

It is considerably more difficult to interrupt direct current than alternating current because direct current contains no naturally-occurring current zeros. With alternating currents, current zeros occur naturally, and to interrupt such currents, it is only necessary to prevent reignition of the arc after a natural current zero. But with direct current, it is necessary first to force the current to zero and then to prevent arc-reignition.

One way of forcing the current to zero is by forcing a locally-controlled current through the interrupter in opposition to the load current flowing therethrough. This is the general approach used in the illustrated interrupting arrangement, where the opposing current is derived from a commutating capacitor 35 that is precharged with the polarity shown in FIG. 1. This commutating capacitor 35 is located in an arc-quenching circuit 36 that is connected across the contacts 27, 28 of the interrupter 25. The arc-quenching circuit 36 is normally maintained in an open condition by suitable means, such as normally-open switch 38, connected in series with the commutating capacitor 35. The illustrated normally-open switch 38 is a vacuum-type circuit interrupter similar in construction to the other interrupter 25. Accordingly, those parts of the switch 38 that correspond to similar parts of the interrupter 25 have been assigned corresponding reference numerals with the suffix $a$.

When the normally-open switch 38 is operated from its open position shown in FIG. 1 to a closed position shown in FIG. 2, commutating capacitor 35 discharges in the direction of arrows 39 through the quenching circuit 36, forcing a current $I_R$ through the interrupter 25 in a direction opposed to the normal load current $I_L$ therethrough.

To interrupt a current $I_L$ flowing through the interrupter 25 in the direction of arrow 17, it is necessary that $I_R$ be considerably larger than the maximum value of $I_L$. Accordingly, the size of the commutating capacitor 35 and the precharged voltage thereon are made large enough to provide an opposing current $I_R$ considerably higher than the maximum value of $I_L$ that it is desired to interrupt.

In a preferred form of my invention, circuit interruption is effected by first separating the contacts 27 and 28 to draw an arc therebetween, as shown in FIG. 2. At a predetermined instant thereafter, the contacts 28$a$, 27$a$ of switch 38 are driven into engagement to complete the quenching circuit 36, as shown in FIG. 2. This forces a reverse current $I_R$ through the quenching circuit in the direction or arrows 39 and through the arc in interrupter 25 in the direction opposed to the load current $I_L$ flowing therethrough. Since $I_R$ is higher than $I_L$, the resultant current flow through the arc is quickly driven to zero, thus extinguishing the arc.

Interruption is successfully completed, however, only if the gap 33 that is then present between the contacts 27, 28 can successfully withstand the recovery voltage that is quickly built up across the gap when the current zero point is reached. Two major factors that have an important effect on whether the interrupter will be able to successfully withstand the recovery voltage are (1) the rate at which current decays immediately preceding current zero and (2) the rate at which the recovery voltage builds up when current zero is reached. Generally speaking, the lower each of these rates, the greater is the likelihood of successful interruption.

I reduce the rate of current decay immediately prior to current zero by providing a saturable reactor 40 in series with the interrupter 25. This reactor has saturation characteristics such that it is completely saturated by normal load currents. But at the low values of current prevailing immediately before current zero, the core comes out of saturation, or desaturates. When the core is unsaturated, further decreases in current as the current zero point is approached will induce an EMF tending to oppose the fall of current. This is equivalent to introducing inductance into the circuit at this instant. To be effective, this inductance should be large compared with the inductance of the quenching circuit, 36.

The manner in which current through the interrupter decays in response to discharging of the commutating capacitor 35 is depicted in the curve $I_{25}$ of FIG. 3. This curve shows the current through the interrupter 25 first rising in response to a fault until the switch 38 closes at A to initiate discharge of commutating capacitor 35. It will be noted that the current drops sharply following initial capacitor-discharge beginning at A until it has reached a relatively low value at B. At this point, the saturable core has come out of saturation and is therefore effective to introduce a relatively large inductance that causes the current to approach zero at $C_1$ along a relatively flat portion of the curve $I_{25}$.

For controlling the rate at which the recovery voltage builds up across the gap 33 in the interrupter 25 after the current zero point $C_1$ has been reached in FIG. 3, the series combination of a capacitor 45 and a damping resistor 46 is connected in parallel with the interrupter 25 and in series with the saturable reactor 40. Assuming that the interrupter 25 is able to withstand the recovery voltage that builds up across it following the point $C_1$ in FIG. 3, the net current through the reactor 40 will reverse following the point $C_1$, and current will flow through the reactor 40 into the voltage-controlling capacitor 45. This current is limited by the reactor 40, which is then out of saturation, and typically it will have a wave form as shown at $C_1EC_2$ on curve $I_{40}$ in FIG. 3. The relatively high impedance presented by the then-unsaturated reactor 40 to current flowing into the voltage-controlling capacitor 45 will prevent the capacitor 45 from acquiring a high potential during this period, and accordingly there will be little voltage across the open interrupter during this period. The peak value G reached in the inverse direction by this voltage across capacitor 45, and hence across interrupter 25, will occur at the second current zero $C_2$ of the reactor current $I_{40}$.

Had the reactor 40 not been present in the circuit that includes the series combination of capacitors 35 and 45 and resistor 46, a much higher inverse voltage would have developed during the period between $C_1$ and F at a substantially earlier instant than peak inverse voltage G developed, thus reducing the chances for the interrupter to withstand this peak inverse voltage.

At about the instant F on curve $I_{40}$ the voltage across the interrupter will reverse and increase in the forward direction. The duration of the voltage pause between $C_1$ and F depends not only upon the saturable reactor 40 but also upon the voltage on capacitor 35 which the reactor 40 is opposing. This voltage is being reduced by the diverted load current that flows into capacitor 35 when the interrupter 25 clears. Generally speaking, the larger the capacitor 35, the longer the period between $C_1$ and F. I therefore use a large enough capacitor 35 to provide a sufficient pause between $C_1$ and F to prevent the recovery voltage from breaking down the gap 33 of the interrupter.

The resistance 46 should ideally be sufficiently large to damp the circuit constituted by quenching circuit 36, resistor 46, capacitor 45 and reactor 40 in series, reactor 40 being in its unsaturated state.

When the commutating capacitor 35 has been charged to its peak voltage following an interrupting operation, there will be no more current flowing from the power line 16 into the quenching circuit 36. When this occurs, the switch 38 is suitably returned from its closed position of FIG. 2 to its open position of FIG. 1. Since no current is then flowing through the quenching circuit 36, no arcing occurs between contacts 27$a$, 28$a$, when they are then separated.

A vacuum-type circuit interrupter is the ideal type of interrupter for use as the main interrupting element in this general type interrupting arrangement. In this respect, it is quiet and simple, has long contact life, and is able to interrupt consistently at the first current zero. Moreover, the contact gap required by a vacuum-type interrupter for a given voltage is exceptionally small, thus permitting shorter operating times and a simpler operating mechanism. But perhaps the greatest advantage of the vacuum-type interrupter is its extremely rapid recovery of dielectric strength following a rapid decrease of current prior to current zero (such as occurs when the reverse current drives the load current to zero, as above described).

Although I have shown a single-break vacuum interrupter being used as the main interrupting element 25, it is to be understood that for higher voltage applications, a number of these units must be connected in series to withstand the higher voltages involved. My invention therefore comprehends an arrangement in which the main interrupter comprises a plurality of interrupting units connected in series for substantially simultaneous opening and for substantially simultaneous closing.

The control circuits for operating the two interrupters 25 and 28 in the desired sequence may be of any suitable conventional type and I have therefore shown them in a highly simplified schematic form. Referring to FIG. 1, the control circuit for the latch 30 of interrupter 25 comprises a conductor 60 extending from the positive to the negative terminals of a control-voltage source through the normally-open contacts 62a of an overcurrent-responsive relay 62 and the coil of a tripping solenoid 64, which controls the latch 30. When the current in line 16 exceeds a predetermined value, the relay 62 picks up, closing its contacts 62a to complete an energizing circuit for the solenoid 64. The solenoid 64 responds by tripping the latch 30 to cause opening of the interrupter 25.

When the movable contact 28 of the interrupter 25 has reached a predetermined point in its opening stroke, it completes a control circuit 70 that causes the closing switch 38 to be operated to closed position. This control circuit 70 comprises a normally-open switch 72 which is closed by a cam 73 on the movable contact 28 when the movable contact reaches a predetermined point in its opening stroke. This completes an energizing circuit for a closing solenoid 76, which responds by operating the closing switch 38 to its closed position. After a predetermined period of time sufficient to enable the current in quenching circuit 36 to be brought to zero, as above described, a suitable time delay switch 78 opens the control circuit 70, thus deenergizing solenoid 76 and permitting a spring 79 to open the closing switch 38.

This same sequence can be initiated at will instead of in response to an overcurrent simply by manually closing a switch 80 in parallel with the normally-open contacts of the overcurrent-responsive relay 62. This completes the trip circuit 60 to initiate the same sequence of operations as described above.

The precharging circuit for the communtating capacitor 35 may be of any suitable conventional form. It is schematically shown in the drawing as comprising a source having opposed terminals 90 and 91 and a switch 92 that can be closed to connect the commutating capacitor across the terminals 90 and 91. Upon closing of the switch 92, the capacitor is charged through a current limiting resistor 94 to a voltage that will be determined by the voltage of the source 90, 91 and with the polarity shown in FIG. 1.

In the embodiments of FIGS. 1 and 2, I use a movable electrode device 38 as the circuit-closing means for the quenching circuit 36. Another way, and a preferred way, of closing this quenching circuit 36 at the desired instant is by using a triggered gap device, for example a triggered vacuum gap device such as disclosed in Patent 3,087,092, Lafferty, assigned to the assignee of the present invention. The triggered gap device (not shown) is normally open, but when the cam-controlled switch 72 on the interrupter 25 is closed in response to opening of interrupter 25, a triggering pulse is applied to the trigger of the gap device. This pulse causes the gap device to arc-over, thereby closing quenching circuit 36 in a manner corresponding to that described hereinabove. When current through the quenching circuit 36 finally reaches zero, as above described, a high dielectric strength is autmatically established across the gap, and the gap device is thus restored to its original condition. A more detailed disclosure of a triggered gap device being used in this manner is contained in application S.N. 357,869, Lee, filed Apr. 7, 1964, now Patent No. 3,252,-050, and assigned to the assignee of the present invention.

Although I have shown a commutating capacitor 35 charged in such a manner that the commutating current initially flows in a direction opposite to the load current upon closing of circuit-making means 38, it is to be understood that the invention in its broader aspects is also applicable to an arrangement in which the polarity of the commutating capacitor is normally reversed and the commutating current is an oscillatory current that first flows in the same direction as the load current and thereafter reverses to drive the load current to zero.

While I have shown and described particular embodiments of my invention, it will be obvious to those skilled in the art that various changes and modifications may be made without departing from my invention in its broader aspects; and I, therefore, intend in the appended claims to cover all such changes as fall within the true spirit and scope of my invention.

What I claim as new and desire to secure by Letters Patent of the United States is:

1. Means for interrupting a high voltage direct-current circuit, comprising:
   (a) a circuit interrupter comprising a pair of separable contacts for connection in series with said circuit,
   (b) means for normally maintaining said contacts in engagement to enable load current to flow therethrough,
   (c) a normally-open arc quenching circuit connected across said contacts and comprising normally-open circuit-making means and a commutating capacitor connected in series circuit relationship with each other,
   (d) means for precharging said commutating capacitor,
   (e) means for separating said contacts to draw an arc therebetween,
   (f) means for forcing the current through said arc to zero comprising means for closing said circuit-making means upon establishment of said arc to discharge said commutating capacitor through said quenching circuit and through said arc,
   (g) means for causing the arc current to decrease at a much lower rate immediately preceding current zero than during the immediately-preceding period of current decrease comprising a normally-saturated saturable reactor connected in series with said circuit interrupter and desaturating during the period immediately preceding current zero,
   (h) and means for controlling the rate of voltage build-up across said interrupter immediately following the point at which current zero is reached, comprising a capacitor connected in parallel with said separable contacts but in series with said saturable reactor.

2. The interrupting means of claim 1 in combination with a damping resistor connected in series with said latter capacitor and said reactor but in parallel with said interrupter contacts.

3. The circuit interrupting arrangement of claim 1 in which said circuit interrupter comprises a vacuum-type circuit interrupting unit.

(References on following page)

References Cited

UNITED STATES PATENTS

| | | | |
|---|---|---|---|
| 1,792,340 | 2/1931 | Wellman | 317—11 |
| 2,126,603 | 8/1938 | Bedford | 317—11 |
| 2,849,659 | 8/1958 | Kesselring | 317—11 |
| 3,152,282 | 10/1964 | Baltensperger | 317—11 |
| 3,252,050 | 5/1966 | Lee | 317—11 |

OTHER REFERENCES

Silicon Controlled Rectifier Manual—3rd ed. General Electric Company, Auburn, N.Y., pp. 255–257.

MILTON O. HIRSHFIELD, *Primary Examiner.*

R. V. LUPO, *Assistant Examiner.*